United States Patent [19]

Kulpa et al.

[11] Patent Number: 4,744,554
[45] Date of Patent: May 17, 1988

[54] DESKEWING DEVICE FOR MAILING MACHINE

[75] Inventors: Walter J. Kulpa, Trumbull; Aaron M. Albert, Bridgeport, both of Conn.

[73] Assignee: Pitney Bowes Inc., Stamford, Conn.

[21] Appl. No.: 917,881

[22] Filed: Oct. 10, 1986

[51] Int. Cl.$^4$ ............................................... B65H 9/16
[52] U.S. Cl. ................................................... 271/251
[58] Field of Search ........................ 271/250, 251, 248

[56] References Cited

U.S. PATENT DOCUMENTS

| | | | |
|---|---|---|---|
| 3,107,090 | 10/1963 | Templeton | 271/251 |
| 4,049,256 | 9/1977 | Church | 271/251 X |
| 4,482,147 | 11/1984 | Hibi | 271/251 X |

FOREIGN PATENT DOCUMENTS 53346  3/1984  Japan .................................. 271/251

Primary Examiner—Richard A. Schacher
Attorney, Agent, or Firm—Charles G. Parks, Jr.; David E. Pitchenik; Melvin J. Scolnick

[57] ABSTRACT

An improved deskewing device for a postage meter mailing machine comprising a support mounted over an upper surface of the mailing machine feed deck. A first feed roller is rotatably mounted on the support upstream from the postage meter with the axis of the first feed roller disposed at an angle within the range of 5 to 30 degrees to the registration guide and spaced laterally from the feed deck registration guide at approximately 0.75 inches. A drive rotates the first feed roller. Mounted in the feed deck is semispherical member directly below the first feed roller. A drag is mounted to the support upstream from the postage meter for encountering the envelope and applying thereto a drag force parallel to the registration guide and counter directional to the envelope traversing direction, the drag being spaced laterally from the registration guide approximately 3.0 inches therefrom and upstream from the first feed roller approximately 0 to 0.6 inches therefrom.

8 Claims, 4 Drawing Sheets

DESKEWING DEVICE FOR MAILING MACHINE

BACKGROUND OF THE INVENTION

Field of the Invention

The present invention relates generally to an improvement in mailing machines and, more particularly, to an envelope deskewing device for a mailing machine which prints postage indicia in a predetermined location on envelopes.

Mailing machines are well known in the prior art and are found in post offices and in mailrooms of companies and business offices the world over. Typically, a mailing machine comprises a feed base having an elongate deck which presents a flat surface on which envelopes can be fed one at a time and a feeding mechanism for feeding the envelopes. Mailing machines may be either hand fed, in which case an operator places a single envelope on the feed deck and slides it into engagement with the feeding mechanism, or automatically fed wherein envelopes are fed seriatim from a stack held in a suitable hopper and transferred across the feed deck.

The mailing machine also includes a postage meter which, with a few exceptions, is removably connected to the feed base. The postage meter, as is well known, is basically a printing device which prints a particular type of postage indicia on the envelope adjacent the upper right hand corner, the printed postage indicia serving in lieu of a postage stamp as proof of payment of the postage charge. Typically, the postage meter has settable printing wheels to facilitate selecting different amounts of postage and dates to be printed, and there are suitable mechanical or electronic means for setting the printing wheels and for keeping track of the amount of postage printed for accounting and security purposes.

The present invention is particularly useful in the hand fed type of mailing machine, but may also be utilized to advantage in automatic mailing machines. In either case, envelopes must be fed through the mailing machine in proper alignment with the printing drum of the postage meter in order to have the postage indicia printed in a precise location and orientation on the envelopes. It is important that the postage indicia be printed in a precise location and orientation in order to assure that there is no loss of any portion on the postage indicia, which would violate federal regulations covering metered mail, and also to assure that there is no loss of the customer's advertising slogan and/or design which may be printed by the meter which would offend the customer. These malfunctions are made possible by the typical mailing machine design. The postage meter is triggered by the lead edge of the envelope striking a trip actuator or energizing an electronic receiving device to signal the arrival of the envelope at a known location. If the envelope is moving through the mailing machine in a skewed relationship, the portion of the envelope which triggers the operation of the postage meter will not be in the proper location when it engages the triggering device, thereby actuating the postage meter either too soon or too late.

Another reason for the importance of feeding the envelopes through the mailing machine in proper registration with the printing drum is to avoid damage to the envelope in other portions of the mailing machine. Typically, mailing machines are provided with a moistening and sealing device upstream from the printing drum of the postage meter. If an envelope is fed through the moistening component in other than a substantially properly aligned orientation, there is a high probability that the flap of the envelope will catch and tear on the moistening component and the envelope will not be properly sealed. It is also quite possible that the tearing of the flap could cause the envelope to jam in the mailing machine and cause a complete malfunction.

After recognizing the importance of providing a deskewing device in a mail handling machine for any one or more of the reasons mentioned above, it was discovered that there is a limitation to the amount of misregistration with which an envelope can be placed on the feed table and still have it become properly registered by the deskewing device before the envelope reaches the printing drum of the postage meter. Prior means have been developed for deskewing a envelope, particularly U.S. patent application Ser. No. 808,198, entitled "Deskewing Device For Mailing Machine", filed Dec. 12, 1984 and assigned to Pitney Bowes, Inc. However, the deskewing device described in the cited application has an expressed entry angle limitation, i.e., the device will properly align an envelope relative to the register provided the angle of entry to the deskewing devices does not exceed 12 degrees.

BRIEF SUMMARY OF THE INVENTION

The present invention is intended to obviate or eliminate the disadvantages and problems discussed above in connection with known mailing machines and improve upon the acceptable entry to the prior deskewing device.

In its broader aspects, the present invention is utilized in a mailing machine having a substantially horizontal envelope feed deck, an elongate registration guide extending along one side edge of the feed deck, a driven rotary frictional drive element mounted beneath the feed deck and protruding upwardly through an opening therein, and a postage meter mounted on the feed deck in a downstream direction from the rotary frictional drive element in position to print postage indicia in a predetermined location on an envelope being fed along the feed deck. The envelope deskewing device comprises a support means mounted over an upper surface of the feed deck, a first rotary frictional drive means mounted on the support means for feeding envelopes along the feed deck in a direction parallel to the registration guide with an edge of the envelopes abutting the registration guide, and a second rotary frictional drive means mounted on the support means and the feed deck upstream from the first rotary frictional drive means for receiving envelopes placed on the feed deck in a random orientation ranging from parallel to the registration guide to a predetermined maximum angle with respect thereto, and for feed envelopes so placed on the feed deck toward the registration guide, thereby aligning the envelopes with the registration guide. The device is also provided with means for driving the first and second rotary frictional drive means in synchronism from the driven rotary frictional drive element. A drag means is pivotal mounted on the support means adjacent the second rotary frictional drive means in position to encounter the envelope being fed by the second rotary frictional drive means if the envelope is placed on the upper surface of the feed deck at an angle to the registration guide which is in the excess of the predetermined angle.

In its preferred embodiment, the first rotary frictional drive element comprises a first feed roller rotatably mounted over the driven rotary frictional drive element and is driven thereby. The second rotary frictional drive means comprises a second feed roller driven in synchronism with the first feed roller and mounted with its axis at an angle to the registration guide, and a semispherical member mounted in the feed deck in driving engagement with the second feed roller. The drag means comprises a generally finger shaped member pivotally mounted to the support means and biased downwardly against the upper surface of the feed deck.

As an envelope is placed on the feed deck at an angle in excess of the predetermined angle, the top surface of the envelope strikes the bottom surface of the drag member. The drag forces applied to the envelope in combination with the drive forces acting on the envelope imparted by the second frictional drive means cause the envelope to deskew.

Objects and advantageous features of the present invention will be more readily apparent from an understanding of the following detailed description of a presently preferred embodiment of the invention when considered in conjunction with the accompanying drawings in which.

DETAILED DESCRIPTION OF THE INVENTION

Figure 1:
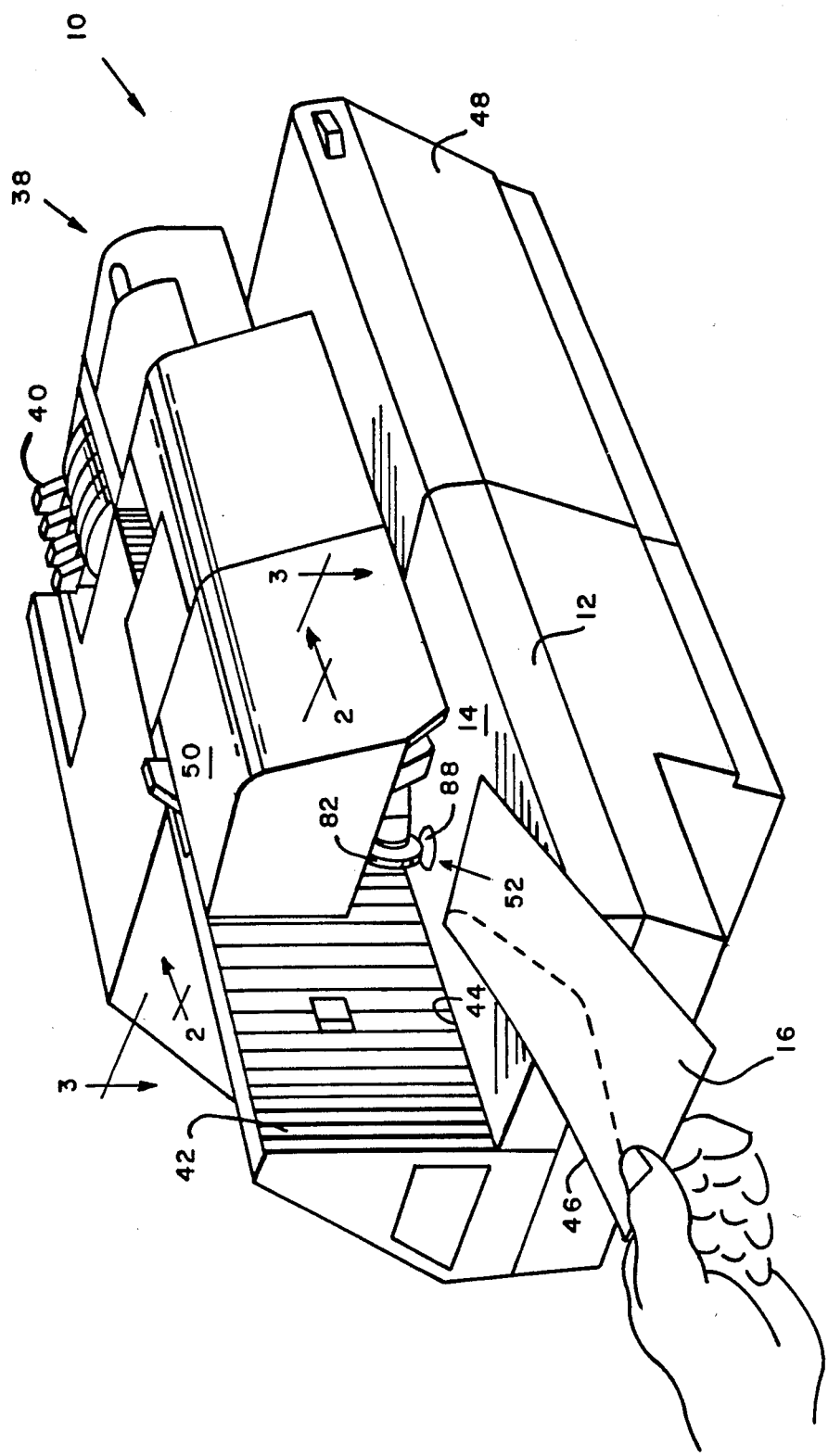
FIG. 1 is an isometric view of the typical mailing machine embodying the present invention and showing an envelope being placed on the feed deck of the mailing machine.
Figure 2:
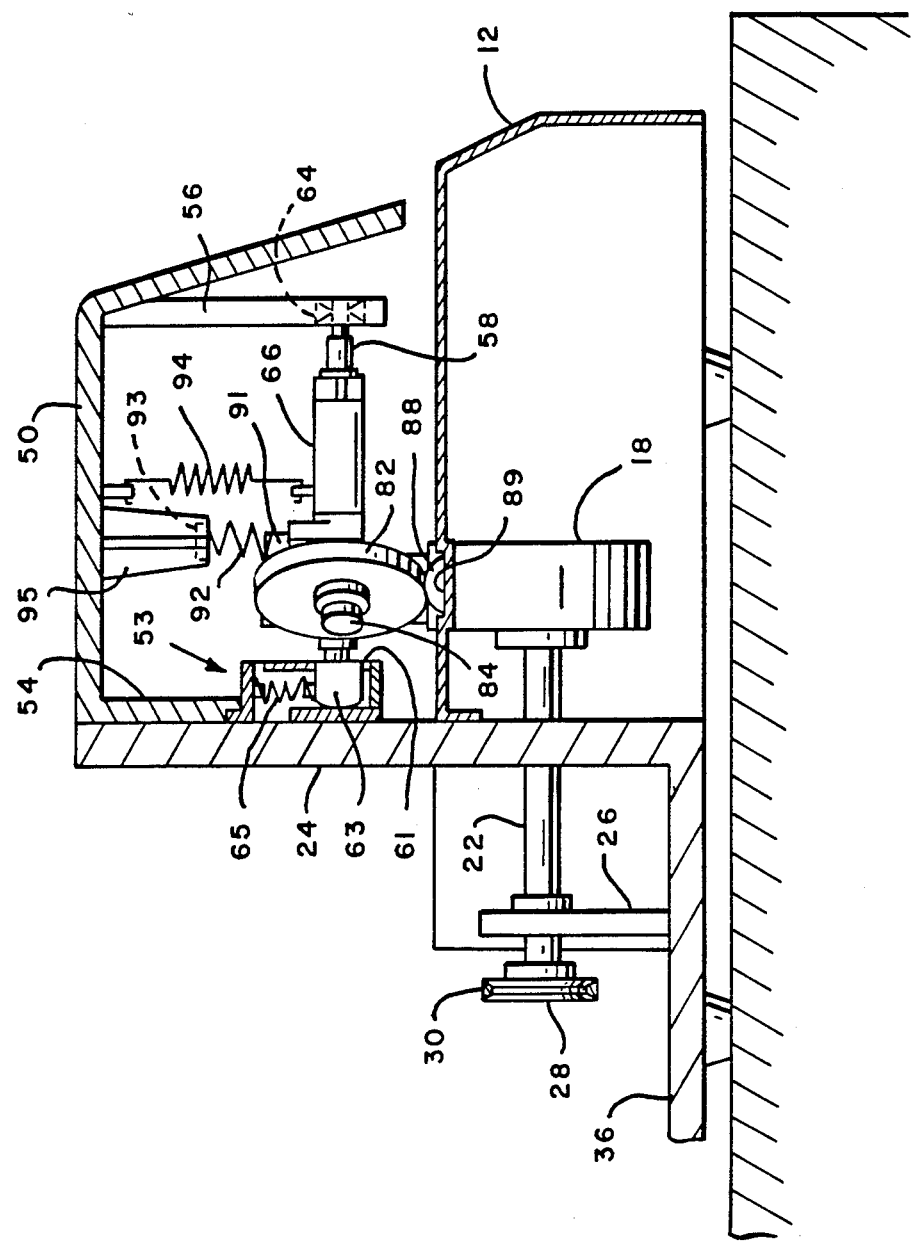
FIG. 2 is a vertical sectional view taken on the line 2—2 of FIG. 1.
Figure 3:
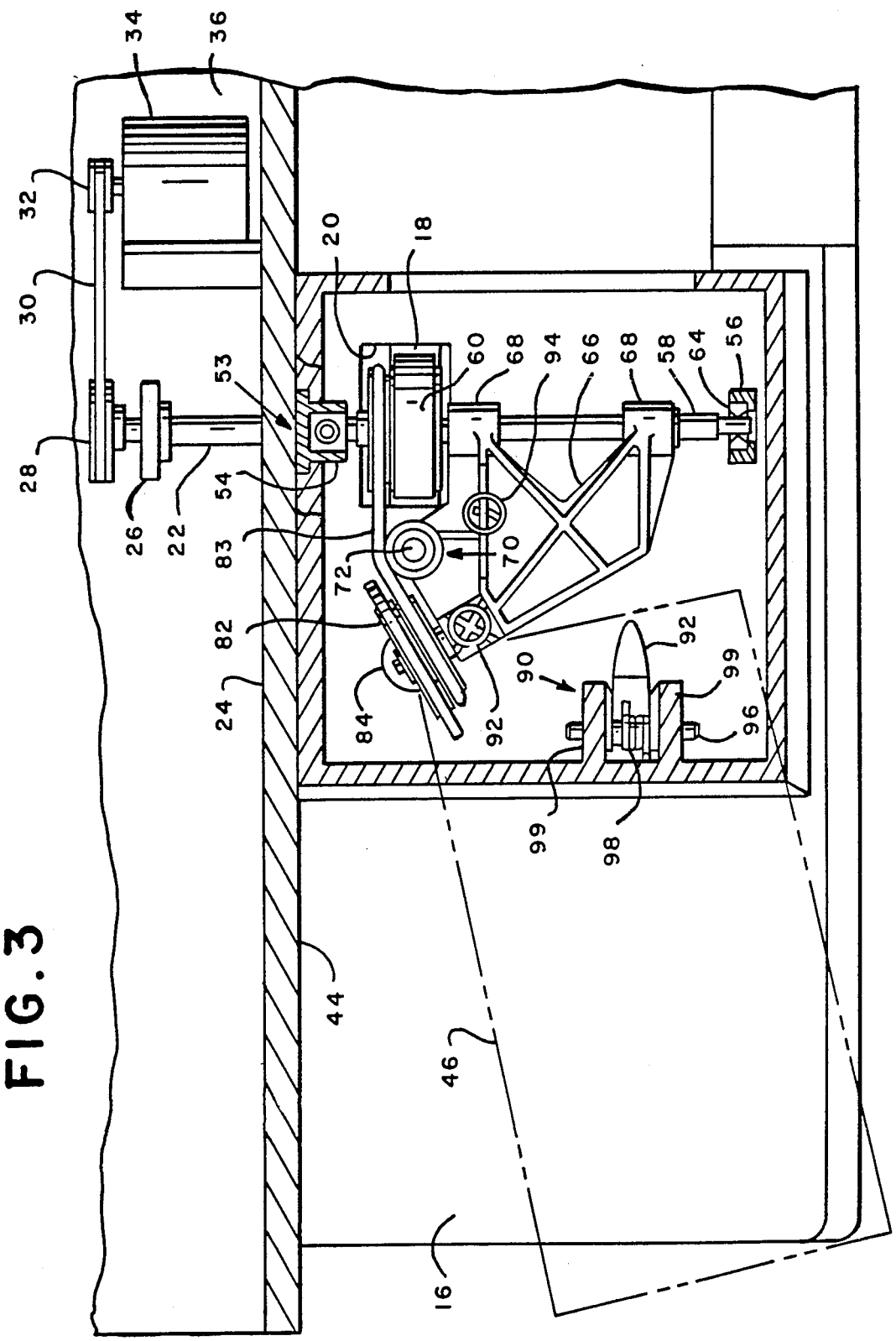
FIG. 3 is a horizontal sectional view taken on the line 3—3 of FIG. 1.
Figure 4:
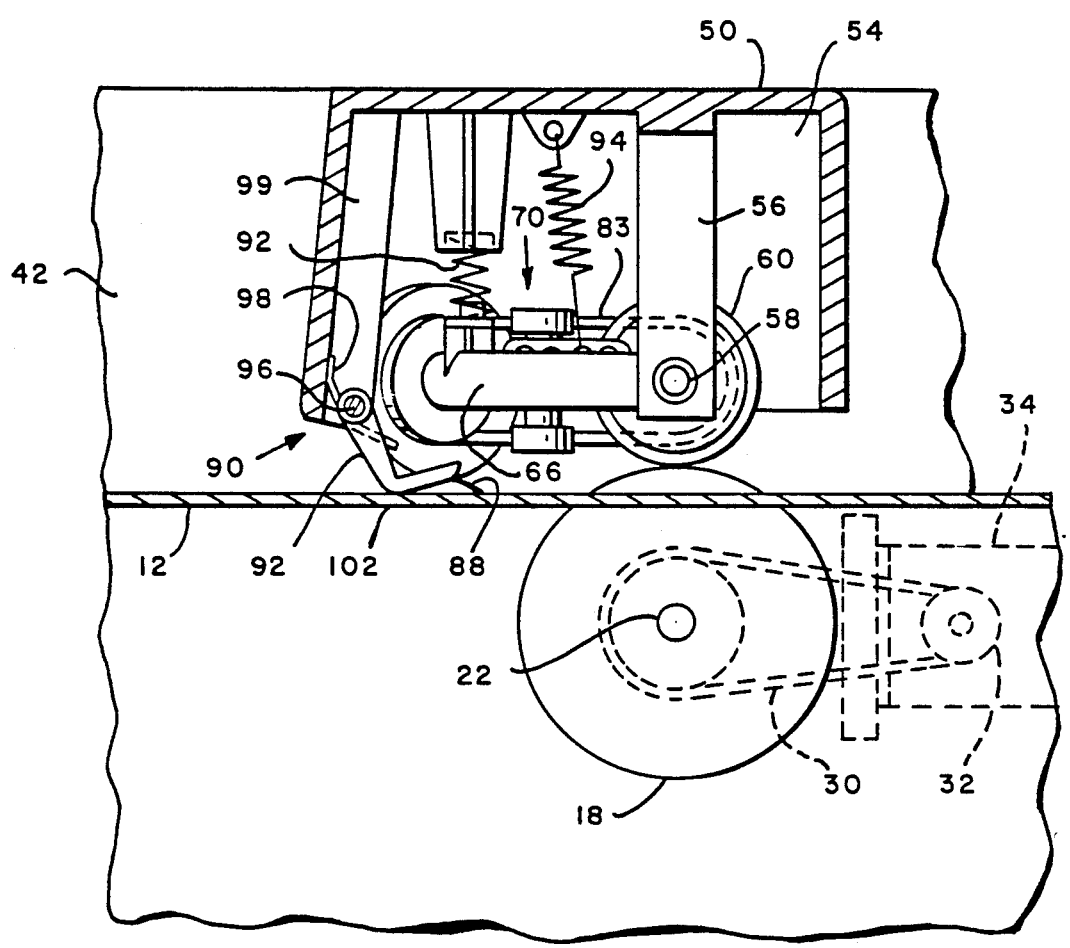
FIG 4 is a partial front view of the feeding and abutment assembly of the present invention.

Referring now to the drawings, and more particularly to FIG. 1 thereof, there is shown a mailing machine generally designated by the reference numeral 10 in which the present invention is embodied and which is an improvement over prior known mailing machines. The mailing machine 10 comprises an elongate feed deck 12 usually extending from one end of the machine to the other, the feed deck having an upper surface 14 along which envelopes 16 are adapted to be fed. As seen in FIGS. 2, 3 and 4, the mailing machine also comprises a driven rotary frictional drive element, particularly the feed roller 18 mounted beneath of feed deck 12 and projecting upwardly through a suitable elongate opening 20 formed in the feed deck 12. The feed roller 18 is mounted on a shaft 22 rotatably mounted in a wall 24 and an adjacent parallel wall 26, and is driven through a pulley 28 driven by a belt 30 which is driven by a pulley 32 mounted on the output shaft of a motor 34 suitably mounted on a portion of the mailing machine base 36.

The mailing machine also comprises a postage meter generally designated by the reference numeral 38 and is located adjacent the downstream end of the feed deck 12 beyond the feed roller 18 in the direction of movement of the envelopes 16. The postage meter 38 is very well known in the art and includes a rotatable printing drum which prints a distinctive postage indicia in a predetermined location on envelopes passing under the printing drum typically in the upper right hand corner of the envelope. The printing drum has settable printing wheels by which the amount of postage printed and the date can be changed at will. A plurality of levers 40 project from the postage meter by which the printing wheels for the amount of postage are set. Other details of the construction and operation of the postage meter are not part of the present invention and are therefore omitted from this description.

The mailing machine 10 also includes an upstanding rear wall 42 the lower edge of which constitutes a registration guide 44 along which the upper longitudinal edge 46 of the envelope 16 must ride in order for the envelope 16 to be properly positioned when it passes under the printing drum of the postage meter 38. If the envelope 16 is not travelling parallel to the registration guide 44 when the postage indicia is printed thereon the indicia will be misaligned and possibly improperly printed on the envelope.

The mailing machine 10 further includes a base housing 48 and another housing 50 which contains a portion of the feed deck 12 for a purpose to be hereinafter made clear.

As seen in FIG. 1, the mailing machine 10 is of the single feed or hand fed type, that is, envelopes are manually placed one by one on the upper portion 14 of the feed deck 12 and are pushed into the feeding mechanism of the mailing machine. There is no automatic feeding device by which a stack of envelopes are automatically fed one after another into the mailing machine. In typical practice, when envelopes are manually placed on the feed deck, they are skewed at an angle to the longitudinal axis of the feed deck 12 and similarly skewed to the registration guide 44, unless the operator exercises great care in placing the envelope on the feed deck. Even with the registration guide 44, a certain amount of time and effort are required by the operator to assure that the upper edge 46 of each envelope 16 placed on the feed deck 12 is in contact with the registration guide 44 and remains in contact therewith while the envelope is being pushed into engagement with the feeding mechanism of the mailing machine. Obviously this greatly diminishes the rate at which envelopes can be fed through the mailing machine and thereby decreases the capacity of the machine. To overcome this drawback, the present invention comprises a deskewing device built into the mailing machine which receives envelopes placed on the feed deck 12 in a random orientation ranging from parallel with the registration guide 44 to a predetermined maximum angle with respect thereto and which feeds an envelope placed in the feed deck in an orientation other than parallel with the registration guide 44 toward the registration guide 44 so as to change the direction of feed of such envelope to parallel with the registration 44, thereby assuring that the envelope will be properly aligned with the feed deck and the printing drum of the postage meter when the envelope passes thereunder. In the preferred embodiment of the invention, the predetermined maximum angle is equal to approximately 45 degrees.

The envelope deskewing device, generally designated by the numeral 52 in FIG. 1, is mounted on a portion of the housing 50 in overlying relationship with the feed deck 12, the details of the deskewing device best appearing in FIGS. 2–4. As best seen in FIGS. 2 and 3, the housing 50 includes a side wall 54 flexible mounted by any conventional means to a upper portion of wall 24. A hub assembly 53 is fixably mounted by conventional means in side wall 54. Vertically suspended from the housing 50 in spaced relationship to the hub assembly 53 is a wall 56. The hub assembly 53 and wall 56 rotatably support a shaft 58. A first rotary frictional drive means in the form of a feed roller 60 is rotatably mounted on the shaft 58 in position to normally engage the feed roller 18 mounted beneath the feed deck 12 and projecting through the opening 20. As best seen in FIG. 2, the hub assembly 53 is provided with a vertical slot 61 in which slot a hub 63 is permitted a limited amount of up and down movement. The hub 63 rotatably supports one end of the shaft 58 which projects through the slot 61 which in turn permits the feed roller 60 to separate sufficiently from the roller 18 to accommodate envelopes of varying thickness. The hub 63 is biased in the down position by a captured spring 65. The other end of the shaft 58 pivots about a spherical bearing 64 in response to the feeding of envelopes of different thickness.

An elongate support frame 66 is pivotally mounted on the shaft 58 by means of a pair of hinge arms 68, and extends in an upstream direction. A pair of intermediate guide rollers generally designated by the reference numeral 70 are rotatably mounted in spaced apart relationship on the support frame by means of a vertically directed stub shaft 72. The stub shaft 72 extends perpendicular to shaft 58 to provide a axis of rotation for guide rollers 70 perpendicular to the rotational axis of feed roller 60.

A second rotary frictional drive means in the form of a feed roller 82 is rotatably mounted on the upstream end of the support frame 66 by means of a stub shaft 84. A endless drive belt 83 extends partially around a circumferential portion of the feed rollers 60 and 82 to provide driving communication from feed roller 60 to feed roller 82. The drive belt 83 also encounters portions of guide roller 70 for providing belt deflection such that the belt 83 assumes a proper tracking angle around feed rollers 60 and 82. It is apparent from the figures that the axis of the roller 82 is disposed at the same angle to and transversely displaced from the registration guide 44. In the preferred embodiment, the roller axis is set at an angle of between 20 to 40 degrees, 30 degrees being the preferred angle, and is spaced from the registration guide 44 at 0.8 to 1.5 inches, 1.0 inches being the preferred displacement. A semi-spherical member 88 is fixable received in a depression 89 in the feed deck 12 on which the feed roller 82 rests, the roller 82 and member 88 consituting part of a rotary frictional drive means carried by the support frame 66 and the feed deck 12, the roller 60 and the intermediate guide rollers 70 being the other part of the rotary frictional drive means. As can best be seen from FIG. 3, the envelope 16 which is placed on the upper surface of the feed deck 12 and which is not in contact with the registration guide will be fed toward the registration guide 44 by the feed roller 82.

In order to provide a proper and uniform feed pressure between the roller 82 and the member 88, the support frame 66 is urged downwardly by the compression spring 65 receiving assistance from a spring 91 after a predetermined upward deflection of the support frame 66. Spring 91 is captured between the upper surface of the frame 66 and the undersurface of the housing 50. That is, the bottom end of the spring 91 rests on the support frame 66 partially around a vertically directed tab 93 formed on the frame 66. The upper end of spring 91 is received in a well 95 formed in a post 97 which post 97 is formed and located within the housing 50. It is noted that in the nominal condition, i.e., when roller 82 is resting on semispherical member 88, the spring 91 is in a relaxed state and is only placed into compression and thereby assisting spring 65 when the roller 82 has been separated from the member 88 by a traversing envelope a distance greater than 1/16 of an inch.

A tension spring 94 is also engaged between the upper surface of the support frame 66 and the undersurface of the housing 50 and pulls upwardly on the support frame 66. The tension spring 94 is employed to equalize the torque caused by driving force of the roller 82 on thin envelopes.

As best viewed in FIG.'S 3 and 4, the deskewing device is provided with a drag means, generally indicated as 90, mounted on the support frame generally adjacent the rotary frictional drive means in position to exert a drag force on an envelope being fed by the roller 82 should an envelope be placed on the feed deck at an angle relative to the registration guide 44 from which the device is capable of aligning before the envelope reaches the rollers 60 and 18. The drag means 90 is comprised of a finger 92 which has a generally L-shape. The finger 92 is pivotally mounted on the forward wall of the housing 50 between flanges 99 along a stub shaft 96. A spring 98 is located around a portion of stub shaft 96 in such a manner as to bias the lower portion of the finger 92 in a generally downwardly direction against the upper surface 14 of the feed deck 12. The finger 92 is located such that the contact point of the finger 92 with the deck surface 14 is laterally opposite to the contact point of feed roller 82 to member 88 at a distance just sufficient enough to apply a drag force to the narrowest envelope anticipated to traverse the mailing machine.

Referring back to FIG. 1, in operation, the envelope 16 is positioned such that its leading end is nearly abutting the envelope deskewing device 52. When the operator continues to forwardly position the envelope 16, the deskewing devide 52 will accept the envelope 16 and register it for proper printing of the metered stamp. If the angle between the top of the envelope 16 and the registration guide 44 is 45° or less, the deskewing device 52 will automatically begin to cause the envelope 16 to turn in a clockwise direction until the top of the envelope 16 registers with the guide 44. The nip between the roller 82 and the semispherical member 88 continuously urges the envelope 16 downstream, while simultaneously being resisted by the lower surface 102 of the finger 92, that is, the envelope is subjected to a drag force.

The envelope 16 is drawn along the feed path causing the finger 92 to be pivoted upwards while continuing to bear upon the upper surface of the envelope 16. The normal force at the conveying nip between the roller 82, and the semispherical member 88 is sufficient to urge and deskew the heaviest mail piece acceptable for printing at the postage meter 38. While the envelope 16 continues moving along under urging by the roller 82, the fed roller 60 also assists in advancing the envelope.

Therefore, having described in detail, the deskewing device for a mailing machine, the advantages of which will be apparent, it will be recognized that modifications to the enclosed drawings or changes made to parts described in the foregoing specification will not in any way alter the spirit and scope of the appended claims.

What is claimed:

1. In a mailing machine having a substantially horizontal mailpiece feed deck, an elongate registration guide extending along one side edge of said feed deck, a postage meter mounted on said feed deck in a downstream direction in position to print postage indicia in a predetermined location on mailpieces being fed along said feed deck wherein the improvement comprises:

deskewing means for causing a mailpiece longitudinally traversing said feed deck at a lengthwise angular relationship relative to said registration guide to be subjected to an alignment drive force and cooperatively acting alignment drag force which forces cause realignment of said mailpiece to be lengthwise parallel and side abutting to said registration guide.

2. In a mailing machine as claimed in claim 1, wherein said deskewing means comprises:

support means mounted over an upper surface of said feed deck;

a first rotary friction drive means mounted to said support means and said feed deck upstream from said postage meter for receiving a mailpiece placed on said feed deck in a random orientation ranging from parallel to said registration guide to a predetermined maximum angle with respect thereto, and for imparting to said mailpiece an alignment drive force at an acute angle relative to said registration guide, said first rotary friction drive means being in spaced relation to said registration guide;

drag means mounted to said support means and said feed deck upstream from said postage meter for encountering the said mailpiece and applying thereto a drag force parallel to said registration guide and counter to the mailpiece traversing directions, said drag means being in further spaced relationship to said registration guide;

whereby the resultant force profile causes said mailpiece to deskew and assume a parallel traversing directing relative to said registration guide.

3. In a mailing machine as claimed in claim 2 wherein said drag means is positioned slightly upstream of said first rotary friction drive means.

4. In a mailing machine as claimed in claims 2 or 3 wherein said drag means comprises a drag finger pivotally mounted to said support means and biasing means for biasing said finger in the direction of said feed deck surface.

5. In a mailing machine having a substantially horizontal envelope feed deck, an elongate registration guide extending along one side edge of said feed deck, a postage meter mounted on said feed deck in a downstream direction in position to print postage indicia in a predetermined location on envelopes being fed along said feed deck, an improved deskewing means for causing an envelope longitudinally traversing said feed deck at a lengthwise angular relationship relative to said registration guide to be subjected to realignment by said deskewing means to assume a parallel alignment relative to said registration guide, wherein the improvement comprises:

support means mounted over an upper surface of said feed;

a first feed roller rotatably mounted on said support means upstream from said postage meter with the axis of said first feed roller disposed at an angle within the range of 20 to 40 degrees to said registration guide and spaced laterally from said registration guide approximately 0.8 to 1.5 inches;

drive means for drivingly rotating said first feed roller;

a semispherical member partly seated in said feed deck directly below said first feed roller;

drag means mounted to said support means and said feed deck upstream from said postage meter for encountering said envelope and applying thereto a drag force parallel to said registration guide and counter directional to the envelope traversing direction, said drag means being spaced laterally from said registration guide approximately 1.74 to 3.0 inches therefrom and upstream from said first feed roller approximately 0 to 1.4 inches therefrom.

6. In a mailing machine as claimed in claim 5 wherein said drag means comprises a finger pivotally mounted to said support means and biasing means for biasing said finger in the direction of said feed deck surface.

7. In a mailing machine as claimed in claim 6 further comprising:

a second rotary friction drive means mounted on said support means for feeding envelopes along said feed deck in a direction parallel to said registration guide with an edge of the envelopes abutting said registration guide longitudinally located between said first feed roller and said postage meter;

means for driving said first feed roller in cooperative speed rotation with said second rotary friction drive means.

8. In a mailing machine as claimed in claim 7 wherein said second rotary frictional drive means comprises:

a second feed roller rotatably mounted on said support means;

said drive means drivenly rotating said second feed roller in synchronization with said first feed roller.

* * * * *